US010620666B1

(12) United States Patent
Munn

(10) Patent No.: US 10,620,666 B1
(45) Date of Patent: Apr. 14, 2020

(54) INTERCHANGEABLE STORAGE AND CHARGING COMPARTMENTS ASSEMBLY

(71) Applicant: Ryan R. Munn, Medford, OR (US)

(72) Inventor: Ryan R. Munn, Medford, OR (US)

( * ) Notice: Subject to any disclaimer, the term of this patent is extended or adjusted under 35 U.S.C. 154(b) by 297 days.

(21) Appl. No.: 15/608,611

(22) Filed: May 30, 2017

Related U.S. Application Data

(60) Provisional application No. 62/347,152, filed on Jun. 8, 2016.

(51) Int. Cl.
| | | |
|---|---|---|
| *H05K 5/00* | (2006.01) | |
| *G06F 1/16* | (2006.01) | |
| *A45C 13/02* | (2006.01) | |
| *H01M 2/10* | (2006.01) | |
| *H01M 10/46* | (2006.01) | |
| *A45C 3/00* | (2006.01) | |

(52) U.S. Cl.
CPC ............ *G06F 1/1628* (2013.01); *A45C 13/02* (2013.01); *H01M 2/1005* (2013.01); *H01M 2/1027* (2013.01); *H01M 10/46* (2013.01); *A45C 2003/008* (2013.01); *A45C 2013/025* (2013.01)

(58) Field of Classification Search
CPC ....................................................... H05K 5/00
See application file for complete search history.

(56) References Cited

U.S. PATENT DOCUMENTS

| | | | |
|---|---|---|---|
| 6,844,494 B1 | 1/2005 | Nevins | |
| 2004/0085694 A1* | 5/2004 | Germagian | ............ A45C 13/02 |
| | | | 361/90 |
| 2004/0090773 A1* | 5/2004 | Bryan | ...................... A45C 3/08 |
| | | | 362/156 |
| 2005/0007070 A1 | 1/2005 | Webb et al. | |
| 2008/0170355 A1 | 7/2008 | Kyriakides et al. | |
| 2012/0098493 A1 | 4/2012 | Budike | |
| 2013/0008752 A1* | 1/2013 | Avganim | ............. A45C 13/103 |
| | | | 190/101 |
| 2013/0113420 A1 | 5/2013 | Majoris, Jr. | |

* cited by examiner

*Primary Examiner* — Jerry Wu
(74) *Attorney, Agent, or Firm* — Jerry Haynes Law

(57) ABSTRACT

An interchangeable storage and charging compartments assembly provides a carrying case that contains a plurality of interchangeable compartments. The compartments are sized and dimensioned to retain a plurality of electronic devices and files that match the dimensions of the corresponding compartments. A foam resilient member retains the contents snugly in the compartments. Each compartment, and the corresponding item contained therein, are interchanged from inside the case to accommodate different electronic devices and files. A power supply member integrated in the case provides power independently to each compartment through individual cables. Thus, electronic devices can be powered and data can be transferred to and from electronic devices. A charging port in the sidewall of the case operatively connects power supply to an external power source for recharging. A lid that can be locked and unlocked over the case with a locking mechanism to protect the contents of the compartment cavity.

17 Claims, 5 Drawing Sheets

INTERCHANGEABLE STORAGE AND CHARGING COMPARTMENTS ASSEMBLY

CROSS REFERENCE OF RELATED APPLICATIONS

This application claims the benefits of U.S. provisional application No. 62/347,152, filed Jun. 8, 2016 and entitled SECURE MULTI-DEVICE CHARGING CASE, which provisional application is incorporated by reference herein in its entirety.

FIELD OF THE INVENTION

The present invention relates generally to an interchangeable storage and charging compartments assembly. More so, the present invention relates to a carrying case that contains a plurality of interchangeable compartments for retaining a plurality of electronic devices, files, and related items that match the dimensions of corresponding compartments; whereby the compartments are added, removed, and interchanged in the case to accommodate different electronic devices and files; whereby an integrated power supply member provides power independently to each compartment through individual cables for powering and transferring data to the electronic devices; and whereby a charging port enables charging the power supply member from an external power source.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a battery charger is a device used to transfer energy into a rechargeable battery by forcing an electric current through it. The charge current depends upon the technology and capacity of the battery being charged. For example, the current that should be applied to recharge a 12 Volt vehicle battery is different than the current required for a smartphone battery. A simple charger works by connecting a constant DC power source to the battery being charged. The simple charger does not alter its output based on time or the charge on the battery.

It is known that a laptop computer or smartphone is limited by the power available from the internal batteries. When the batteries become discharged, a source of power is needed to recharge them. Typically, such electronic devices includes a power adapter for connecting the to a power utility outlet for recharging the batteries and powering the computer. Typically, power adapters are not interchangeable and can only be used with a specific brand or model electronic device. If a power adapter is lost or malfunctions, it cannot be easily replaced.

Furthermore, travelers who regularly use smartphones, tablets, and laptop computers, do not have access to a power utility outlet, such as when they are on an airplane or in a car. For example, airport travelers struggle to find time to charge their electrical devices because of the limited number of outlets available. Furthermore, such locations have different types of power sources however. Airlines have begun installing power connectors for providing DC power for passenger equipment. Automobiles have cigarette lighters or similarly designed power jacks which provide 12 volt DC power from the automobile battery. Additionally, international travelers encounter utility power connectors which differ from those in the United States. For example, utility power in Europe is 220 volts compared to 110 volts in the United States.

Other proposals have involved carrying and charging electronic devices. The problem with these storage and charging devices is that they do not allow multiple electronic devices and files to be carried and charged simultaneously. Also, recharging the battery can be problematic while on the move. Even though the above cited storage and charging devices meets some of the needs of the market, an interchangeable storage and charging compartments assembly comprising a carrying case that contains a plurality of interchangeable compartments for retaining a plurality of electronic devices, files, and related items that match the dimensions of corresponding compartments; whereby the compartments are added, removed, and interchanged in the case to accommodate different electronic devices and files; whereby an integrated power supply provides power independently to each compartment through individual cables for powering and transferring data to the electronic devices; and whereby a charging port enables charging the power supply member from an external power source is still desired.

SUMMARY

Illustrative embodiments of the disclosure are generally directed to an interchangeable storage and charging compartments assembly. The assembly provides a carrying case that contains a plurality of interchangeable compartments. The compartments are sized and dimensioned to retain a plurality of electronic devices and files that match the dimensions of the corresponding compartments. A foam resilient member retains the contents snugly in the compartments. Each compartment, and the corresponding item contained therein, may be interchanged from inside the case to accommodate different electronic devices and files. An integrated power supply member in the case provides power independently to each compartment through individual cables. In this manner, the electronic devices can be powered and data can be transferred to and from the electronic devices. A charging port in the sidewall of the case operatively connects the power supply to an external power source for recharging. The case has a lid that can be locked and unlocked with a locking mechanism to protect the contents of the compartment cavity.

In one aspect, an interchangeable storage and charging compartments assembly, comprises:
  a case comprising a base wall and a sidewall, the base wall and the sidewall defining a compartment cavity and a power cavity;
  a barrier separating the compartment cavity from the power cavity;
  a plurality of compartments adapted to fit in the compartment cavity of the case, the plurality of compartments being interchangeable in the compartment cavity of the case;
  a power supply member adapted to fit in the power cavity of the case;
  a plurality of cables extending between the power supply member and the plurality of compartments;
  a charging port forming in the sidewall, the charging port operatively connected to the power supply member;

a lid hingedly joined with the sidewall of the case, the lid selectively covering and uncovering the compartment cavity; and a locking mechanism for locking and unlocking the lid in relation to the compartment cavity, the locking mechanism comprising an engaging portion adapted to join with the lid, the locking mechanism further comprising a base portion detachably receiving the engaging portion.

In another aspect, the case comprises a hard plastic carrying case defined by a sleek design with rounded edges, and a width of at least 5".

In another aspect, at least two of the plurality of compartments are sized and dimensioned differently.

In another aspect, the plurality of compartments are adapted to receive at least one of the following: an electronic device, a battery, a file, and paperwork.

In another aspect, the assembly further comprises a charging insert, the charging insert adapted to fit inside the plurality of compartments.

In another aspect, the charging insert operatively connects the electronic device to the power supply member.

In another aspect, the assembly further comprises a resilient member adapted to snugly retain the electronic device, the file, the battery, the file, and the paperwork inside the plurality of compartments.

In another aspect, the resilient member is a foam.

In another aspect, the power supply member is a rechargeable battery.

In another aspect, the plurality of cables comprises a power supply end and a compartment end.

In another aspect, the charging port receives a power cable from an external power source.

In another aspect, the assembly further comprises a strap joined at a pair of free ends with the sidewall of the case.

In another aspect, the engaging portion and the base portion are a quick release clip.

One objective of the present invention is to carry one or more personal electronic devices while charging them with a power supply member, such as an internal rechargeable battery.

Another objective is to eliminate the need to carry multiple charging cords.

Another objective is to snugly retain electronic device, the file, the battery, the file, and the paperwork inside the plurality of compartments with a foam.

Yet another objective is to remove, add, and interchange the compartments, including the electronic device, the file, the battery, the file, and the paperwork inside the plurality of compartments in the case.

Yet another objective is to charge the power supply member form an external power source through the charging port.

Yet another objective is to provide a locking mechanism that prevents the case from unlocking.

Yet another objective is to provide an inexpensive to manufacture carrying case that recharges electronic devices and batteries, and securely retains files and paper work.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
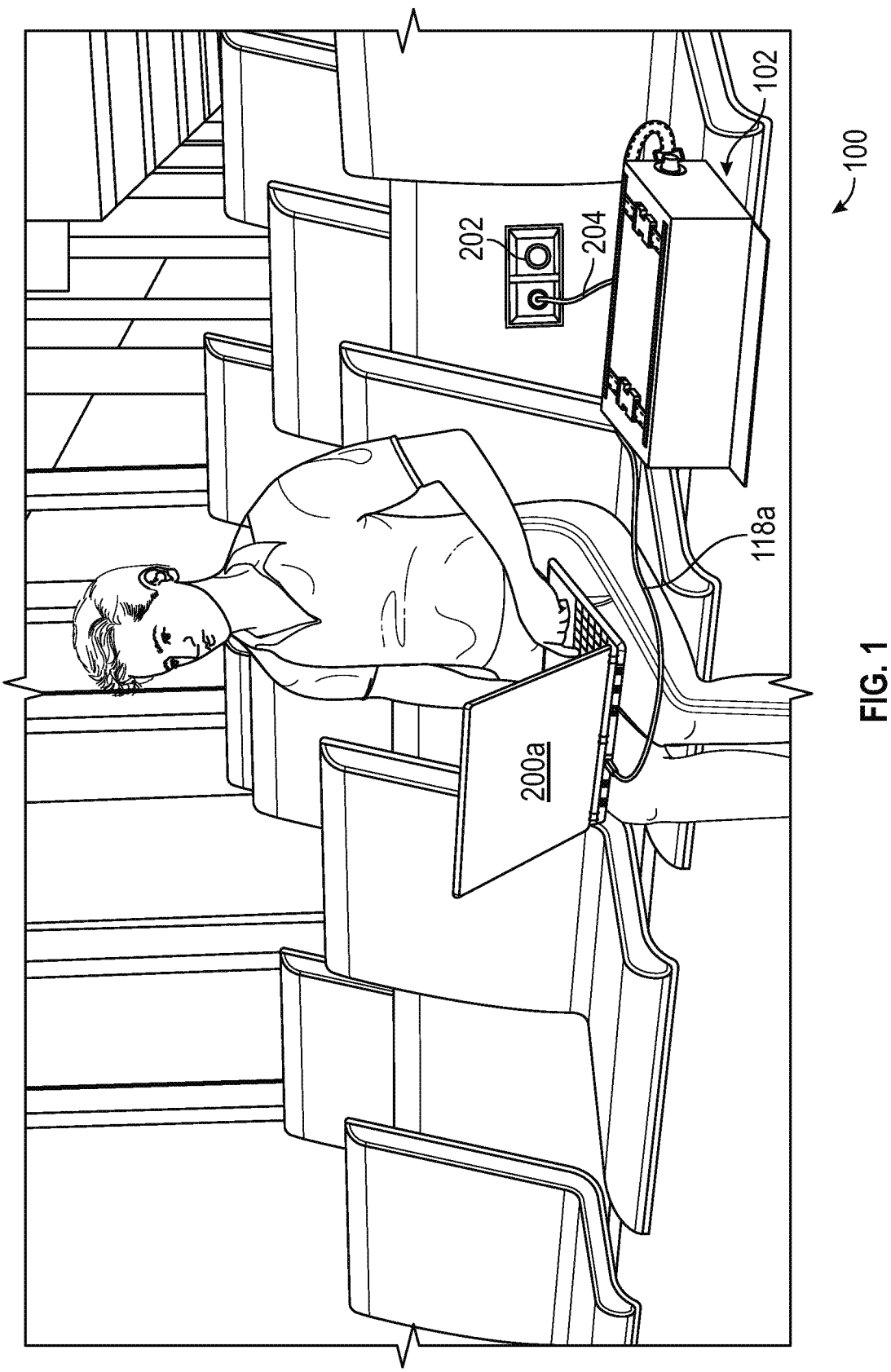
FIG. 1 illustrates a perspective view of an exemplary interchangeable storage and charging compartments assembly recharging an electronic device and receiving a charge from an external power source, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An interchangeable storage and charging compartments assembly 100 is referenced in FIGS. 1-5. The interchangeable storage and charging compartments assembly 100, hereafter "assembly 100" serves as a carrying case for carrying and recharging electronic devices and files that also allows the electronic devices and files to be interchanged while within their own individual rechargeable compartments 114a-d. This creates an efficient, interchangeable adaptation of electronic devices and files that can be selectively carried and charged, as needed. In addition to allowing quick access and storage of various electronic devices, the carrying case 102 also allows the individual electronic devices to be easily connected to the power source and eliminates the need to carry multiple charging cords.

In some embodiments, the assembly 100 provides a case 102 that contains a plurality of interchangeable compartments 114a-d. The compartments 114a-d are sized and dimensioned to retain a plurality of electronic devices 200a-d and files that match the dimensions of the corresponding compartments 114a-d. A foam resilient member 138 retains the electronic devices 200a-d and files snugly in the compartments 114a-d. Each compartment 114a-d, and the corresponding item contained therein, may be interchanged from inside the case 102 to accommodate different electronic devices 200a-d and files, and also to serve the carrying and storage needs of the user.

An integrated power supply member 116 in the case 102 provides power independently to each compartment through individual cables 118a-c. In this manner, the electronic devices 200a-d can be powered and data can be transferred to and from the electronic devices. A charging port 124 in the sidewall 106 of the case 102 operatively connects the power supply to an external power source for recharging. The case 102 has a lid 126 that can be locked and unlocked with a locking mechanism 128 to protect the contents of the compartment cavity 108 from unauthorized use.

As referenced in FIG. 1, the assembly 100 comprises a case 102 for carrying the electronic devices 200a-d and files. In one embodiment, the case 102 comprises a hard carrying case having a generally rectangular shape, and adapted for office or school work. Though in other embodiments, a resilient case, or any type of case 102 may be used, including a case 102 for carrying work tools, food, paperwork, and sporting equipment. Additional items that may be carried in the case 102 include, documents, electronic tablets or laptop computers, and accessories. The case 102 is resilient and may be fabricated from canvas, polyester, vinyl, rubber, and combinations thereof.

Figure 2:
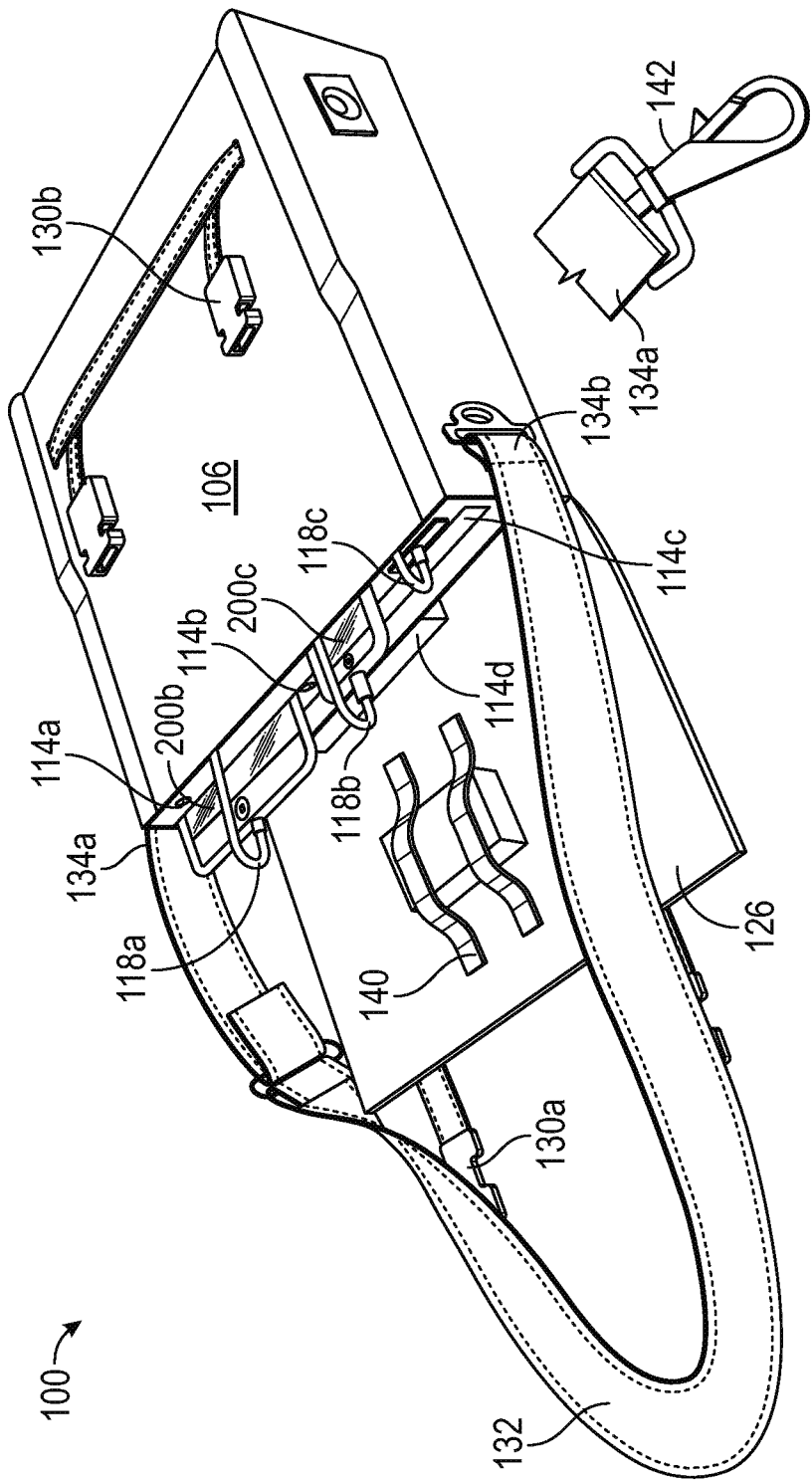
FIG. 2 illustrates a perspective view of an exemplary case with the lid open, exposing a plurality of compartments containing an electronic device, in accordance with an embodiment of the present invention.

Turning now to FIG. 2, the case 102 is defined by a base wall 104 and a sidewall 106. The base wall 104 and the sidewall 106 define a compartment cavity 108 and a power cavity 110 that are separated by a barrier 112. The compartment cavity 108 is sufficiently spacious to contain the compartments and the contents therein. The power cavity 110 is generally smaller than the compartment cavity 108, and used to store a power supply member 116, as discussed below.

In some embodiments, a strap 132 attaches to the case 102 to help in carrying and mobility of the case 102. The strap 132 is joined at a pair of free ends 134a, 134b with the sidewall 106 or the base wall 104 of the case 102. In one embodiment, a carabiner 142 attaches to the pair of free ends 134a, 134b of the strap 132 to enable detachable attachment of the case to a mounting surface.

In some embodiments, a lid 126 hingedly joins with the sidewall 106 of the case 102. The lid 126 selectively covers and uncovers the compartment cavity 108. The lid 126 may hinge about the sidewall 106 from one edge of the lid 126. To enhance security of the contents of the case 102, a locking mechanism 128 for locking and unlocking the lid 126 in relation to the compartment cavity 108 is used. The locking mechanism 128 may include an engaging portion 130a adapted to join with the lid 126, and a base portion 130b detachably receiving the engaging portion 130a. The engaging portion 130a and the base portion 130b may include a quick release clip. In other embodiments, the locking mechanism 128 may, however, include pin tumblers, padlocks, and other case locking devices known in the art.

In yet another embodiment, an accessory fastener 140 may be used on the inside of the lid to retain an accessory, such as an adapter, a cable, a pencil, or an instrument. Though in other embodiments, the accessory fastener 140 may be located anywhere on the case. In one embodiment, the accessory fastener 140 is a strip of hook and loop fasteners.

Figure 3:
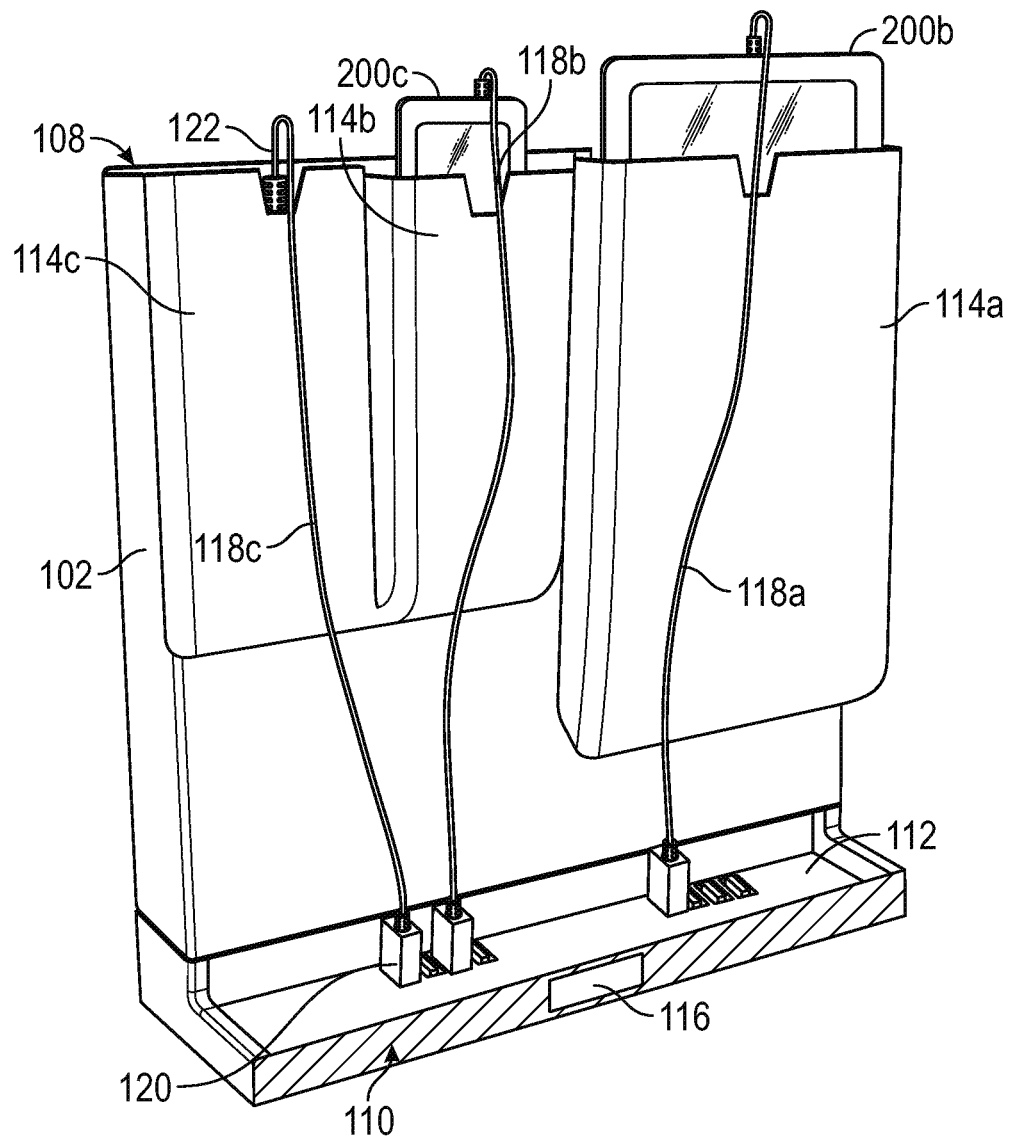
FIG. 3 illustrates a left side perspective view of a case showing a sectioned view of the power cavity containing a power supply member, in accordance with an embodiment of the present invention.

As referenced in FIG. 3, a plurality of compartments 114a-d are adapted to fit in the compartment cavity 108 of the case 102. The compartments 114a-d are adapted to receive at least one of the following: an electronic device, a battery, a file, and paperwork. Each item that is stored in the case 102 is provided an individual compartment. In some embodiments, a resilient member 138 lines the compartments 114a-d to create a snug fit for the item inside the compartment. The resilient member 138 may include foam, cork, or other resilient materials known in the art.

One of the unique features of the assembly 100 is that the compartments 114a-d are interchangeable in the compartment cavity 108 of the case 102. The compartments 114a-d easily slide in and out of the compartment cavity 108 enable addition, removal, or interchangeability of compartments. Thus, the item, along with its individual compartment, can be moved around as the user requires for carrying or charging. To help in this regard, at least two of the compartments 114a-d are sized and dimensioned differently. For example, a wide flat compartment 114d can be used to retain a laptop, while a narrow compartment 114a, 114b, 114c can be used to store smartphones, smaller accessories, paperwork, or individual batteries.

In some embodiments, a power supply member 116 is adapted to fit inside the power cavity 110 of the case 102. FIG. 3 illustrates the power supply member 116 inside the power cavity 110 of the case 102 disposed near a bottom and of the case 102. In other embodiments the power supply member 116 may, however, be disposed anywhere along the sidewalls 106 of the case 102. The power supply member 116 is the component that recharges any of the electronic devices that are stored in the case 102. In one embodiment, the power supply member 116 is a rechargeable battery. In other embodiments, the power supply member 116 may, however, be a nickel-cadmium battery, a wet cell, a dry cell, a 9 Volt, one or more electrochemical cells with external connections provided to power electrical devices, and a dedicated recharging device.

Figure 4:
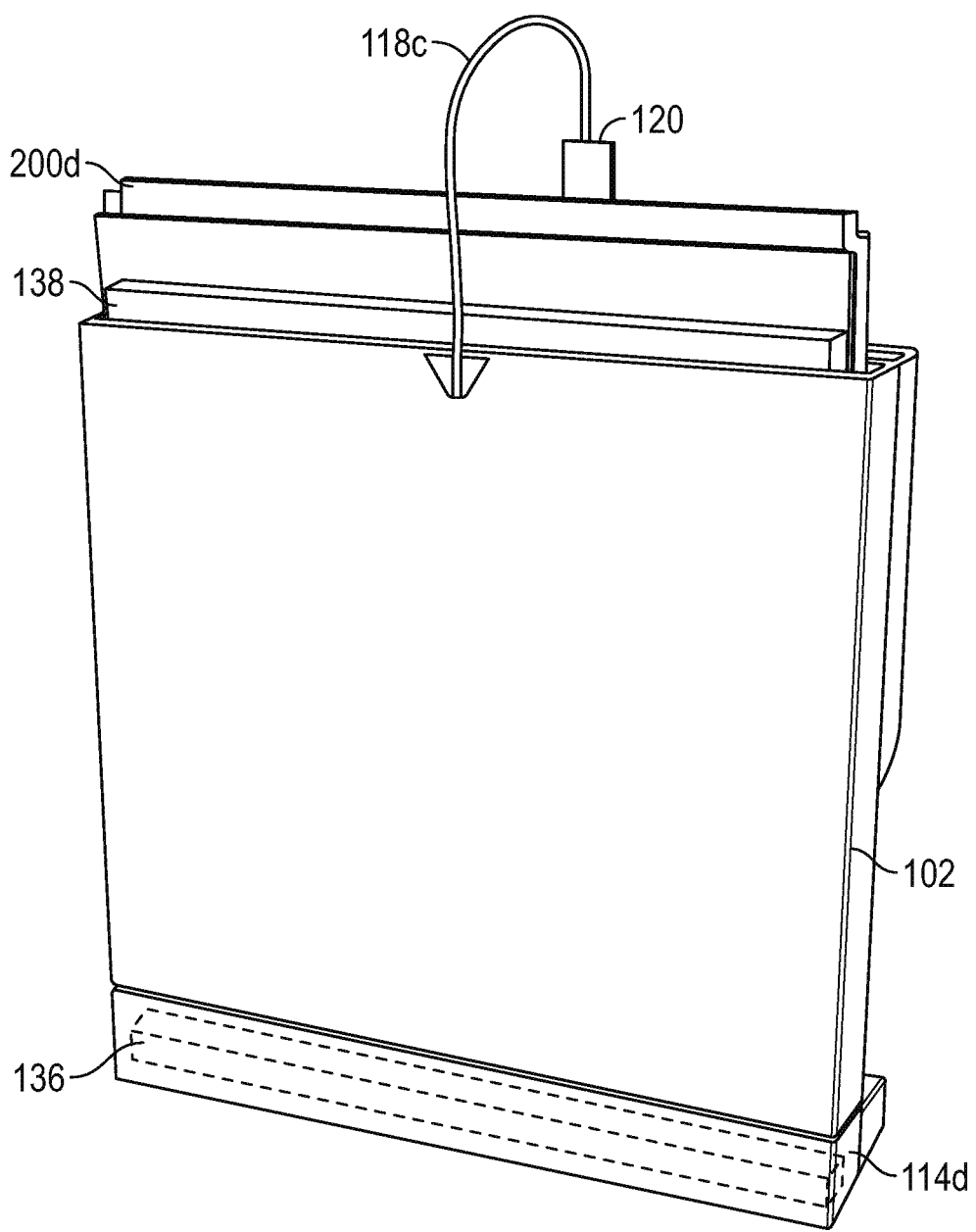
FIG. 4 illustrates a right side perspective view of a case showing a sectioned view of a charging insert and a resilient member inside the compartment, in accordance with an embodiment of the present invention.

Looking at FIGS. 3 and 4, a plurality of cables 118a-c extend between the power supply member 116 and the plurality of compartments 114a-d. The cables 118a-c are defined by a power supply end 120 that couples to the power supply member 116, and a compartment end 122 that couples into the electronic device 200a-d.

It is significant to note that with different cables 118a-c and connectors input to the power supply member 116, different AC or DC power sources may also be utilized. Different plugs, adapters, and electrical circuitry can also be used to provide power to different electronic devices. In one embodiment, the charging function works by connecting a constant DC power source to the power supply member 116 being charged. Furthermore, data can also be transferred with the cables 118a-c. In this manner, two or more electronic devices 200a, 200b, 200c, 200d in the individual compartments 114a-d can be connected to exchange data while also being recharged simultaneously.

To further assist in recharging the electronic device, a charging insert 136 fits inside the compartments 114d, serving as an adapter compartment (FIG. 4). The charging insert 136 operatively connects the electronic device 200d to the power supply member 116. Thus, the compartment end of the cable plugs into the charging insert 136 while the electronic device also plugs into the charging insert 136 to receive the required charge. In one embodiment, the charging insert 136 is a USB charging dock.

Figure 5:
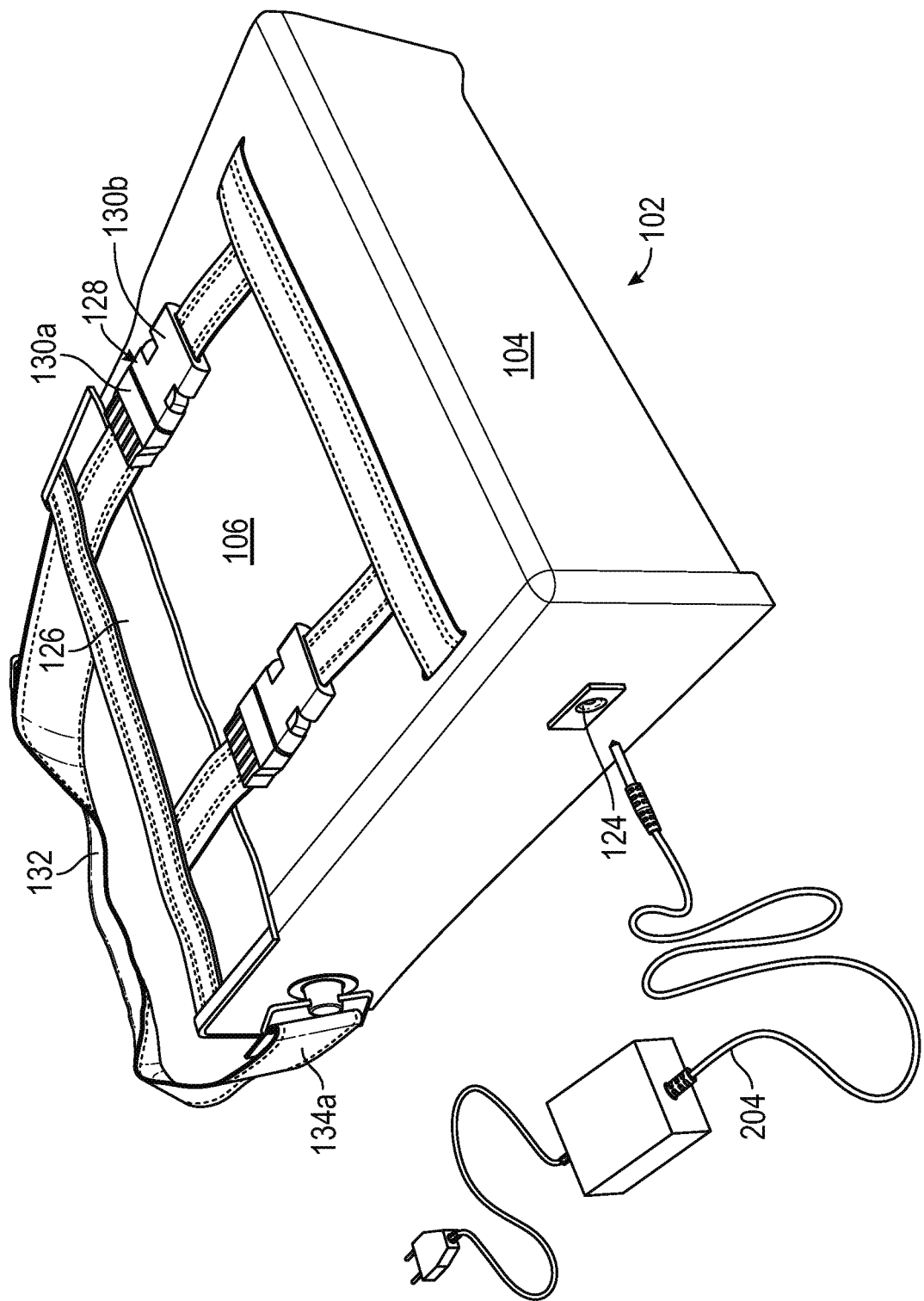
FIG. 5 illustrates a perspective view of a case having a charging port, in accordance with an embodiment of the present invention.

Turning now to FIG. 5, the assembly 100 also provides a means to recharge the power supply member 116. This may include a charging port 124 that forms in the sidewall 106, the charging port 124 operatively connected to the power supply member 116. The charging port 124 receives a power cable 204 from an external power source 202. The charging port 124 is adapted to receive various types of input cables and plugs. In some embodiments, multiple charging ports may be used. In an alternative embodiment, each compartment lines with its own individual charging port; whereby external power cables 118*a-c* feed each compartment to recharge the electronic device 200*a-d* contained therein.

One exemplary configuration of the case 102 includes: a hard plastic case with a locking lid. The hard plastic case is defined by a sleek design with rounded edges that is at least 5" wide. The lid 126 may include hinged or rolling lid with the ability to lock secures the contents of the hard plastic case. The compartments 114*a-d* may include multiple interior device pockets lined in shock resistant foam are arranged in the hard plastic case. The pockets have the capacity to carry 1 laptop, 1 tablet and 3 phones. All such electrical devices would be positioned upright with the charging port toward the bottom of the case while secure in their individual pockets. In other embodiments, the case, lid, and compartments can have any shape, dimension, and are scalable.

Built into the base wall 104 would be the power supply member 116. The charging insert 136 may include a single strip charger the width of the case with 4 USB ports for the phones and tablet and a single two prong port for the electrical device. In one alternative embodiment, the cords 114*a* include a retractable outlet cord would be possible. The individual devices would connect via cords. The charging port 124 can also include a multi-port charger that connects to a wall outlet via a removable cord that would attach externally. In alternative embodiments, an extra pocket is integrated inside the case 102 to house cords 114*a-d* as well to create a truly all-in-one product.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An interchangeable storage and charging compartments assembly, the assembly comprising: a case comprising a base wall and a sidewall comprising left, right, front and rear walls, the base wall and the sidewall defining a compartment cavity and a power cavity; a barrier connecting the left, right, and front walls and separating the compartment cavity from the power cavity; a plurality of compartments adapted to fit in the compartment cavity of the case, the plurality of compartments being interchangeable in the compartment cavity of the case; a power supply member adapted to fit in the power cavity of the case; a plurality of cables extending between the power supply member and the plurality of compartments, wherein the plurality of cables comprises a power supply end and a compartment end; a charging port forming in the left or right walls, the charging port operatively connected the power supply member to a cable of an external power source; a lid hingedly joined with the sidewall of the case, the lid selectively covering and uncovering the compartment cavity; and a locking mechanism for locking and unlocking the lid in relation to the compartment cavity, the locking mechanism comprising an engaging portion adapted to join with the lid, the locking mechanism further comprising a base portion detachably receiving the engaging portion; and a charging insert, wherein the charging insert is adapted to fit inside the compartment adjacent to the power cavity and the base wall and comprises a USB charging dock connecting to the power supply member, wherein the compartment end plugs into the charging insert while the electronic device also plugs into the charging insert.

2. The assembly of claim 1, wherein the case is a hard plastic carrying case defined by a sleek design with rounded edges, and a width of at least five inches.

3. The assembly of claim 1, wherein the at least two of the plurality of compartments are sized and dimensioned differently.

4. The assembly of claim 1, wherein the plurality of compartments are elongated and flat.

5. The assembly of claim 1, wherein the plurality of compartments are adapted to receive at least one of the following: an electronic device, a battery, a file, and paperwork.

6. The assembly of claim 5, wherein the charging insert operatively connects the electronic device to the power supply member.

7. The assembly of claim 6, further comprising a resilient member adapted to fit in the plurality of compartments, the resilient member adapted to snugly retain the electronic device, the file, the battery, the file, and the paperwork inside the plurality of compartments.

8. The assembly of claim 7, wherein the resilient member is a foam.

9. The assembly of claim 1, wherein the power supply member is a rechargeable battery.

10. The assembly of claim 1, further comprising a strap defined by a pair of free ends, the pair of free ends joined with the sidewall of the case.

11. The assembly of claim 1, wherein the engaging portion and the base portion of the locking mechanism are a quick release clip.

12. The assembly of claim 1, further comprising an accessory fastener disposed on the lid.

13. An interchangeable storage and charging compartments assembly, the assembly comprising: a case comprising a base wall and a sidewall comprising left, right, front and rear walls, the base wall and the sidewall defining a compartment cavity and a power cavity; a barrier connecting the left, right, and front walls and separating the compartment cavity from the power cavity; a plurality of compartments adapted to fit in the compartment cavity of the case, the plurality of compartments being interchangeable in the compartment cavity of the case; at least one resilient member adapted to fit in at least one of the plurality of compartments; a power supply member adapted to fit in the power cavity of the case; a plurality of cables extending between the power supply member and the plurality of compartments; a charging port forming in the left or right walls, the charging port operatively connected the power supply member to a cable of an external power source; a lid hingedly joined with the sidewall of the case, the lid selectively covering and uncovering the compartment cavity; a locking mechanism for locking and unlocking the lid in relation to the compartment cavity, the locking mechanism comprising an engaging portion adapted to join with the lid, the locking mechanism further comprising a base portion detachably receiving the engaging portion; and a strap defined by a pair of free ends, the pair of free ends joined with the sidewall of the case; and a charging insert, wherein the charging insert is adapted to fit inside the compartment adjacent to the power cavity and the base wall and comprises a USB charging dock connecting to the power supply member, wherein the compartment end plugs into the charging insert while the electronic device also plugs into the charging insert.

14. The assembly of claim 13, wherein the plurality of compartments are adapted to receive at least one of the following: an electronic device, a battery, a file, and paperwork.

15. The assembly of claim 13, wherein the power supply member is a rechargeable battery.

16. The assembly of claim 13, further comprising an accessory fastener disposed on the lid.

17. An interchangeable storage and charging compartments assembly, the assembly consisting of: a case comprising a base wall and a sidewall comprising left, right, front and rear walls, the base wall and the sidewall defining a compartment cavity and a power cavity; a barrier connecting the left, right, and front walls and separating the compartment cavity from the power cavity; a plurality of compartments adapted to fit in the compartment cavity of the case, the plurality of compartments being interchangeable in the compartment cavity of the case, the plurality of compartments adapted to receive at least one of the following: an electronic device, a battery, a file, and paperwork; at least one foam resilient member adapted to fit in at least one of the plurality of compartments; a rechargeable battery adapted to fit in the power cavity of the case; a plurality of cables extending between the rechargeable battery and the plurality of compartments; a charging port forming in the left or right walls, the charging port operatively connected the rechargeable battery to a cable of an external power source; a lid hingedly joined with the sidewall of the case, the lid selectively covering and uncovering the compartment cavity; an accessory fastener disposed on the lid; a quick release clip for locking and unlocking the lid in relation to the compartment cavity; a strap defined by a pair of free ends, the pair of free ends joined with the sidewall of the case; and a carabiner attached to the pair of free ends of the strap; and a charging insert, wherein the charging insert is adapted to fit inside the compartment adjacent to the power cavity and the base wall and comprises a USB charging dock connecting to the power supply member, wherein the compartment end plugs into the charging insert while the electronic device also plugs into the charging insert.

* * * * *